(12) United States Patent
Okada

(10) Patent No.: US 8,513,611 B2
(45) Date of Patent: Aug. 20, 2013

(54) RADIATION DETECTING ELEMENT AND RADIOGRAPHIC IMAGING DEVICE

(75) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 13/067,865

(22) Filed: Jun. 30, 2011

(65) Prior Publication Data

US 2012/0001079 A1 Jan. 5, 2012

(30) Foreign Application Priority Data

Jul. 2, 2010 (JP) .................................. 2010-152354

(51) Int. Cl.
*G01T 1/20* (2006.01)

(52) U.S. Cl.
USPC ..................................... 250/366; 250/370.11

(58) Field of Classification Search
USPC ................................................. 250/361, 366
See application file for complete search history.

(56) References Cited

U.S. PATENT DOCUMENTS

| | | | | |
|---|---|---|---|---|
| 4,879,464 A * | 11/1989 | Iinuma | ...................... | 250/361 R |
| 6,867,418 B2 * | 3/2005 | Suzuki et al. | ................. | 250/368 |
| 6,891,164 B2 * | 5/2005 | Suzuki | ..................... | 250/370.11 |
| 6,919,569 B2 * | 7/2005 | Homme et al. | .......... | 250/370.11 |
| 7,616,231 B2 * | 11/2009 | Farrier | ...................... | 348/208.99 |
| 2002/0050940 A1 * | 5/2002 | Sato et al. | ...................... | 341/155 |
| 2002/0101527 A1 * | 8/2002 | Endo | ............................. | 348/302 |
| 2006/0076499 A1 * | 4/2006 | Endo | ......................... | 250/370.11 |
| 2006/0113484 A1 * | 6/2006 | Endo | ........................ | 250/370.11 |
| 2006/0181627 A1 * | 8/2006 | Farrier | .......................... | 348/308 |
| 2009/0190932 A1 * | 7/2009 | Nishino et al. | ................ | 398/140 |
| 2009/0214219 A1 * | 8/2009 | Misawa et al. | ................ | 398/128 |
| 2009/0214220 A1 * | 8/2009 | Nishino et al. | ................ | 398/130 |
| 2010/0038549 A1 * | 2/2010 | Nishino et al. | ........... | 250/370.09 |
| 2010/0054399 A1 * | 3/2010 | Nishino et al. | .................. | 378/28 |
| 2010/0207032 A1 * | 8/2010 | Tsubota et al. | .......... | 250/370.09 |

FOREIGN PATENT DOCUMENTS

| | | |
|---|---|---|
| JP | 2002-181942 | 6/2002 |
| JP | 2004-170216 A | 6/2004 |
| JP | 2007-151761 | 6/2007 |
| JP | 2008-132216 A | 6/2008 |

* cited by examiner

*Primary Examiner* — David Porta
*Assistant Examiner* — Taeho Jo
(74) *Attorney, Agent, or Firm* — Jean C. Edwards; Edwards Neils PLLC

(57) ABSTRACT

The present invention provides a radiation detecting element and a radiographic imaging device that may reliably detect radiation even when a region where radiation is irradiated is set narrowly. Namely, in the radiation detecting element and the radiographic imaging device of the present invention, plural pixels including radiographic imaging pixels and plural radiation detection pixels are disposed in a matrix in a detection region that detects radiation.

11 Claims, 11 Drawing Sheets

RADIATION DETECTING ELEMENT AND RADIOGRAPHIC IMAGING DEVICE

CROSS-REFERENCE TO RELATED APPLICATION

This application claims priority under 35 USC 119 from Japanese Patent Application No. 2010-152354, filed on Jul. 2, 2010, the disclosure of which is incorporated by reference herein.

BACKGROUND OF THE INVENTION

1. Field of the Invention

The present invention relates to a radiation detecting element and a radiographic imaging device. The present invention particularly relates to a radiation detecting element with plural pixels arrayed in a matrix, in which charges generated due to irradiation of radiation are accumulated, and the amount of accumulated charges are detected as image information, and to a radiographic imaging device that uses the radiation detecting element for imaging a radiographic image.

2. Description of the Related Art

In recent years, radiographic imaging devices using a radiation detecting element such as a flat panel detector (FPD) that includes a radiation-sensitive layer placed on a thin-film transistor (TFT) active matrix substrate and can convert radiation such as X-rays directly into digital data, have been put to practical use. FPDs have advantages in that, compared to conventional imaging plates, images can be checked instantaneously and moving images can also be checked, and the spread of FPDs is rapidly progressing.

Various types are proposed for such radiation detecting element. There are, for example, direct-conversion-type radiographic imaging devices that convert radiation directly to charge in a semiconductor layer, and accumulate the charge. There are also indirect-conversion-type radiographic imaging devices that first convert radiation into light with a scintillator, such as CsI:Tl, GOS ($Gd_2O_2S$:Tb) or the like, then convert the converted light into charge in a semiconductor layer and accumulate the charge.

In radiation detecting elements, charges are generated by dark current or the like, even when the pixels are not being irradiated by radiation, and the charges are accumulated in the pixels. Accordingly, in the radiographic imaging devices using the radiation detecting elements, during standby, a reset operation that extracts and removes the charges that have been accumulated in the pixels are repeatedly performed. Further, in the radiographic imaging devices using the radiation detecting elements, when imaging, the reset operation are stopped, and the charges are accumulated during the irradiation period in which the pixels are irradiated by radiation. Furthermore, after the end of the irradiation period, the radiographic imaging devices using the radiation detecting elements perform read-out of the charges that have been accumulated in the pixels of the radiation detecting element.

As technologies that synchronize the timing of irradiation of radiation and the timing of the start of charge accumulation by the radiation detecting element, Japanese Patent Application Laid-Open (JP-A) No. 2002-181942 and JP-A No. 2007-151761, discloses a sensor capable of detecting radiation placed separately outside an imaging region of the radiation detecting element. In these technologies, accumulation of the charges is started by the radiation detecting element when radiation has been detected by the sensor.

Here, in radiographic imaging, the region where the radiation is irradiated is set as narrowly as possible, in order to prevent unnecessary exposure of examinees and radiologic technologists to radiation. That is, the region irradiated with radiation is set such that only the portion to be imaged is irradiated by radiation.

Accordingly, in the technologies described in JP-A No. 2002-181942 and JP-A No. 2007-151761, since the region irradiated with radiation has been narrowly set, there are cases where irradiation of radiation cannot be detected with the sensor.

SUMMARY OF THE INVENTION

The present invention provides a radiation detecting element and a radiographic imaging device that may reliably detect radiation even when the region irradiated by radiation has been narrowly set.

A first aspect of the invention is a radiation detecting element including: a plurality of pixels disposed in a matrix in a detection region that detects radiation, each pixel including a sensor portion that generates charges based on irradiation of radiation or on illumination of light that has been converted form radiation, and a switch element for reading out the generated charges; a plurality of first scan lines, connected to the switch elements included in pixels that have been employed as radiographic imaging pixels out of the plurality of pixels, through which control signals for switching the switch elements flow; a plurality of second scan lines, connected to the switch elements included in pixels that have been employed as radiation detection pixels among the plurality of pixels, through which control signals for switching the switch elements flow; and a plurality of signal lines, connected to the switch elements, through which electric signals flow corresponding to the charges that have been generated in the pixels, in accordance with the switching state of the switch elements.

In the radiation detecting element of the present invention, pixels (each of which includes a sensor portion that generates charges due to irradiation of radiation, or illumination of light into which radiation has been converted, and a switch element for reading out the generated charges) are plurally disposed in a matrix in a detection region that detects radiation.

Additionally, in the present invention, first scan lines are connected to switch elements included in pixels that have been employed as radiographic imaging pixels among the plural pixels, control signals that switch the switch elements flow in the first scan lines, second scan lines are connected to switch elements included in pixels that have been employed as radiation detection pixels among the plural pixels, and control signals that switch those switch elements flow in the second scan lines. Signal lines are connected to the switch elements included in the plural pixels, and electric signals corresponding to the charges that have been generated in the pixels, in accordance with the switching state of the switch elements, flow in the signal lines.

Thus, according to the present invention, plural pixels including radiographic imaging pixels and radiation detection pixels are disposed in a matrix in a detection region that detects radiation, so radiation may be reliably detected by the radiation detection pixels even when the region irradiated by radiation has been narrowly set.

In a second aspect of the present invention, in the first aspect, the radiation detection pixels may be plurally disposed with intervals equal to or greater than one pixel apart from each other, on some signal lines among the plurality of signal lines.

In a third aspect of the present invention, in the above aspects, the pixels for detecting radiation may be intensively placed in a specific region in the detection region.

In a fourth aspect of the present invention, in the above aspects, the plurality of second scan lines may be disposed only at pixel rows in which the radiation detection pixels are disposed in the matrix array.

In a fifth aspect of the present invention, in the above aspects, one ends of the second scan lines may be connected in parallel.

A sixth aspect of the present invention is a radiographic imaging device including: the radiation detecting element of the first aspect of the invention; a first control signal output section that, when imaging a radiographic image, repeatedly outputs control signals for performing read out of the charges to the plurality of second scan lines; and a detection section that detects, on the basis of the electric signals flowing in the plurality of signal lines, at least one of the start of irradiation of radiation, the end of irradiation of radiation, and an amount of irradiated radiation.

Thus, the sixth aspect of the present invention is configured in the same way as the first aspect of the present invention, so radiation may be reliably detected by the radiation detection pixels even when the region irradiated by radiation has been narrowly set.

In a seventh aspect of the present invention, in the sixth aspect, the detection section may detect the start of irradiation of radiation, and the radiographic imaging device may further include, a second control signal output section that outputs control signals for performing read out of the charges to the plurality of first scan lines, a creation section that creates image information representing a radiographic image on the basis of the electric signals flowing in the plurality of signal lines, and a control section which, during standby, controls the second control signal output section so as to repeatedly perform a reset operation, which outputs control signals for reading out the charges with respect to the plurality of first scan lines to extract the charges from the pixels for radiographic imaging of the radiation detecting element, and, when imaging a radiographic image, when the start of irradiation of radiation has been detected by the detection section, controls the second control signal output section to output control signals that prohibit extraction of the charges with respect to the plurality of first scan lines and, after the end of irradiation of radiation, output control signals that perform extraction of the charges to the plurality of first scan lines.

In an eighth aspect of the present invention, in the seventh aspects, the control section may control the second control signal output section to repeatedly perform the reset operation until the start of irradiation of radiation is detected by the detection section when imaging a radiographic image.

In a ninth aspect of the present invention, in the above aspects, the control section may control the second control signal output section to output control signals that prohibit extraction of the charges with respect to the plurality of first scan lines, while the first control signal output section is outputting control signals that perform extraction of the charges with respect to the plurality of second scan lines.

In a tenth aspect of the present invention, in the above aspects, the second control signal output section may output control signals for reading out the charges sequentially to the plurality of scan lines, or at once to all of the plurality of scan lines, during the reset operation.

In an eleventh aspect of the present invention, in the above aspects, the creation section may interpolate image information of the radiation detection pixels to create image information representing a radiographic image.

According to the above aspects of the present invention, the present invention may reliably detect radiation even when the region irradiated by radiation has been narrowly set.

BRIEF DESCRIPTION OF THE DRAWINGS

An exemplary embodiment of the present invention will be described in detail based on the following figures, wherein.

DETAILED DESCRIPTION OF THE INVENTION

An exemplary embodiment of the present invention will be described below with reference to the drawings.

In the present exemplary embodiment, a case where the present invention is applied to an indirect-conversion-type radiation detecting element 10 that first converts radiation such as X-rays into light, and then converts that light into charges, will be described.

Figure 1:
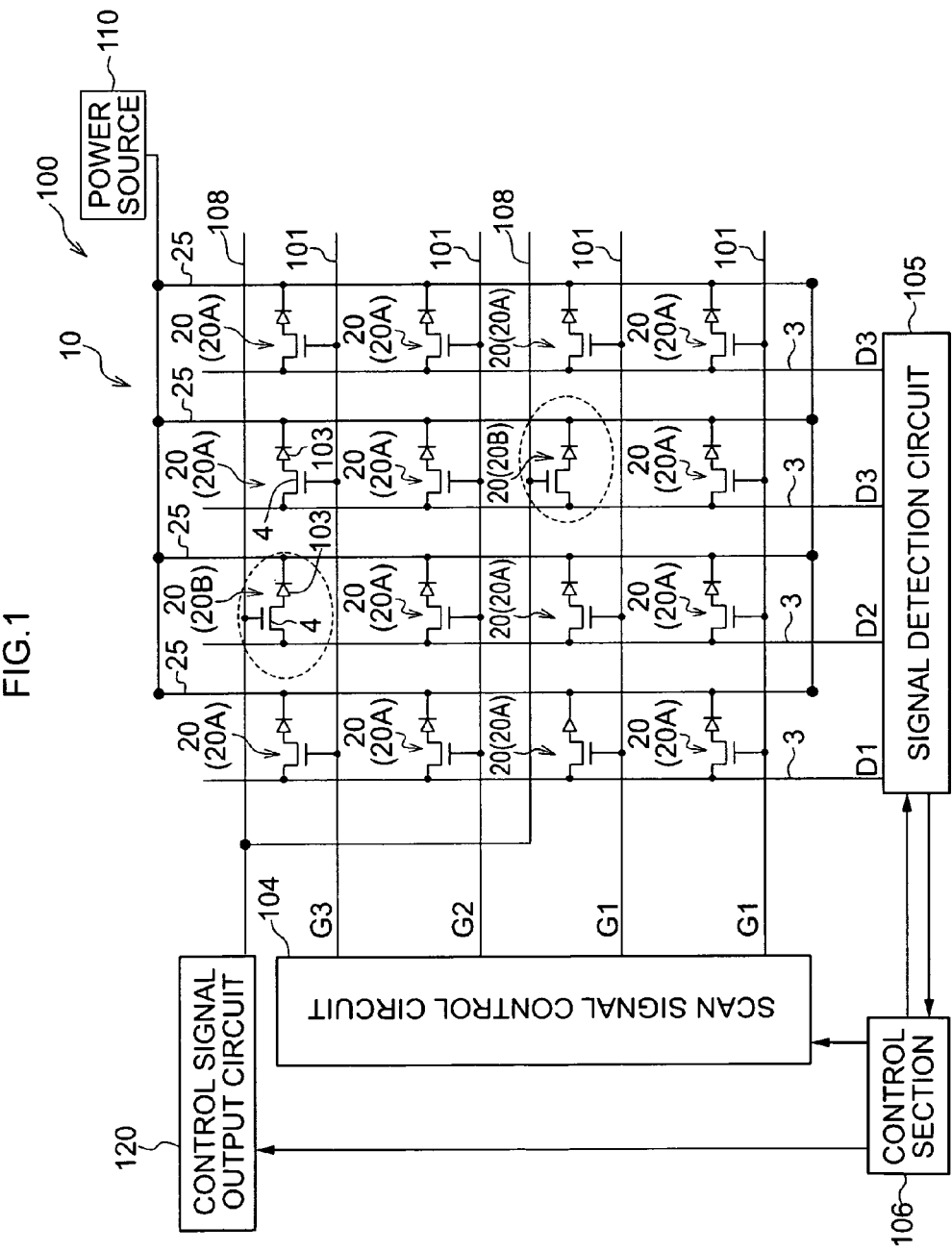
FIG. 1 is a diagram showing the overall configuration of a radiographic imaging device, according to the exemplary embodiment.

FIG. 1 shows the overall configuration of a radiographic imaging device 100 using the radiation detecting element 10 according to the present exemplary embodiment.

As shown in FIG. 1, the radiographic imaging device 100 according to the present exemplary embodiment is equipped with the indirect-conversion-type radiation detecting element 10. A scintillator that converts the radiation into light is omitted.

Plural pixels 20 are placed in the radiation detecting element 10. Each of the pixels 20 is configured to include a sensor portion 103 and a TFT switch 4. The sensor portion 103 receives light, generates charges, and accumulates the generated charges. The TFT switch 4 is for reading out the charges that have been accumulated in the sensor portion 103. In the present exemplary embodiment, the sensor portions 103 generate the charges as a result of being illuminated by the light into which the radiation has been converted by the scintillator. The TFT switches 4 correspond to switch elements of the present invention.

Figure 5:
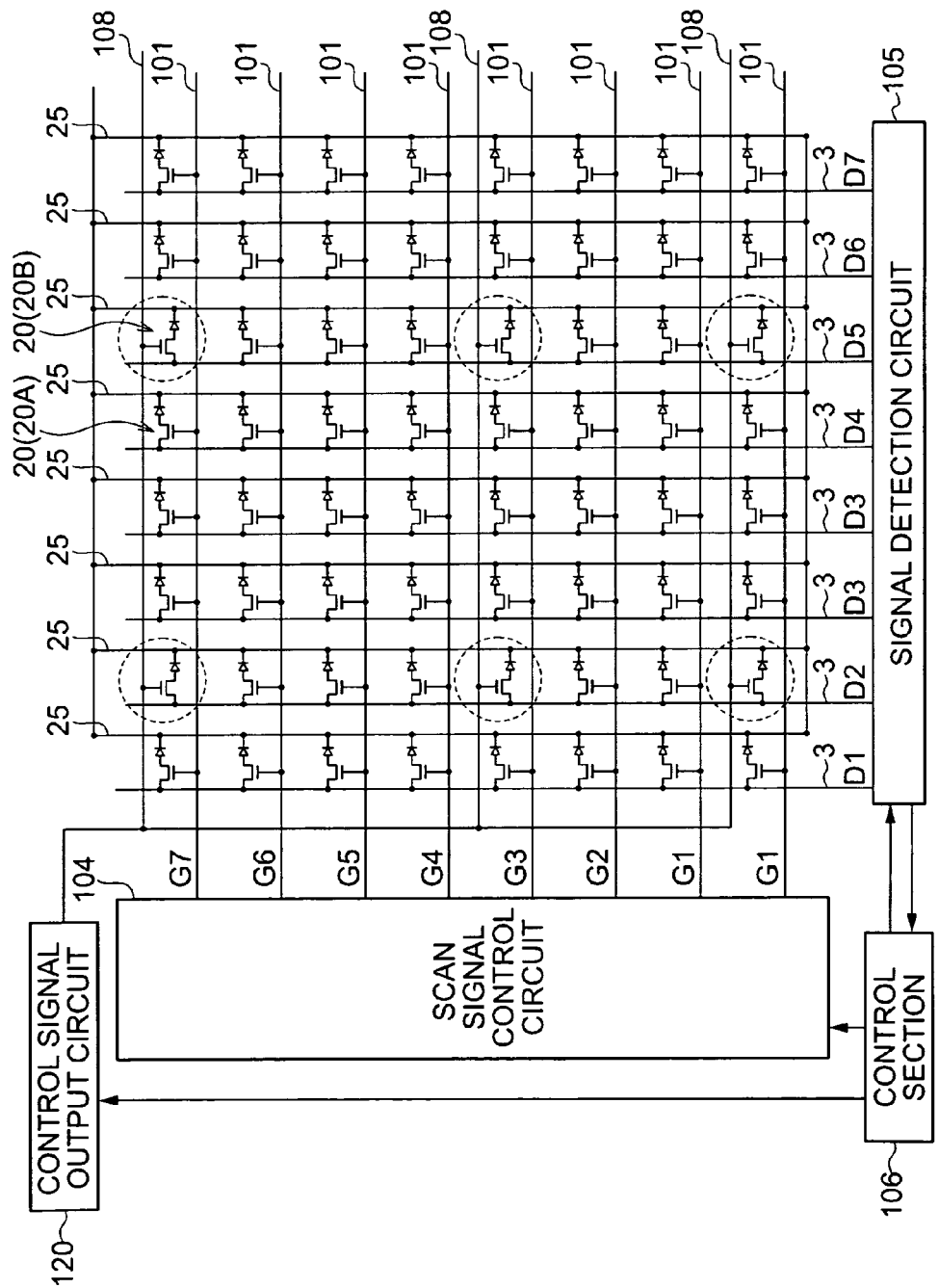
FIG. 5 is a configuration diagram showing a configuration of radiographic imaging pixels and radiation detection pixels of the radiation detecting element, according to the exemplary embodiment.

The pixels 20 are plurally placed in a matrix in one direction (the horizontal direction in FIG. 1; hereinafter called a "row direction" below) and in an intersecting direction (the vertical direction in FIG. 1; hereinafter called a "column direction" below) with respect to that row direction. In FIG. 1 and FIG. 5, the pixel 20 array is depicted in a simplified way; however, there are, for example, 1024×1024 of the pixels 20 placed in the one direction and in the intersecting direction.

In the present exemplary embodiment, among the plural pixels 20, pixels 20A for radiographic imaging (radiographic imaging pixels) and pixels 20B for radiation detection (radiation detection pixels) are employed. In FIG. 1 and FIG. 5, the radiation detection pixels 20B are encircled by dashed lines. The radiographic imaging pixels 20A are used to detect the radiation and to create an image represented by the radiation. The radiation detection pixels 20B are used to detect the start of irradiation of the radiation.

Figure 3:
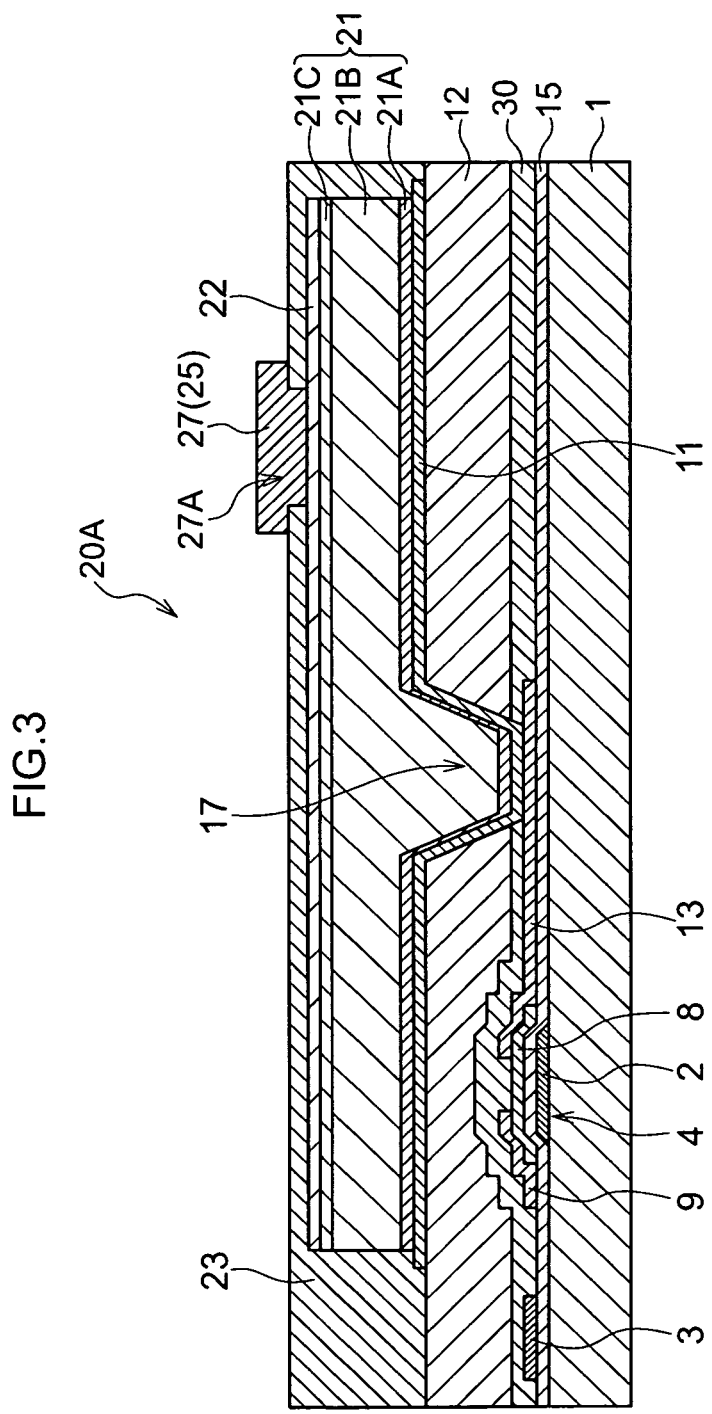
FIG. 3 is a cross-sectional view, taken along line A-A of FIG. 2, of the radiation detecting element, according to the exemplary embodiment.

Further, in the radiation detecting element 10, plural first scan lines 101 for switching the TFT switches 4 ON and OFF, and plural signal lines 3 for reading out the charges that have been accumulated in the sensor portions 103, are disposed intersecting each other on a substrate 1 (see FIG. 3). In the present exemplary embodiment, the signal lines 3 are disposed such that there is one each for each pixel row in the one direction, and the first scan lines 101 are disposed such that there is one each for each pixel row in the intersecting direction. For example, in a case where there are 1024×1024 of the pixels 20 placed in the one direction and in the intersecting direction, the signal lines 3 and the first scan lines 101 are disposed such that there are 1024 of each.

Further, in the radiation detecting element 10, second scan lines 108 are disposed parallel to each of the first scan lines 101 in the intersecting direction, in which the radiation detection pixels 20B are disposed.

Among the plural pixels 20, in the radiographic imaging pixels 20A, the gates of the TFT switches 4 are connected to the first scan lines 101. Further, in the radiation detection pixels 20B, the gates of the TFT switches 4 are connected to the second scan lines 108. Further, in both the radiographic imaging pixels 20A and the radiation detection pixels 20B, the sources of the TFT switches 4 are connected to the signal lines 3.

Moreover, in the radiation detecting element 10, common electrode lines 25 are disposed in parallel to each of the signal lines 3. One ends and the other ends of the common electrode lines 25 are connected in parallel, and the one ends of the common electrode lines 25 are connected to a power source 110 that supplies a predetermined bias voltage. The sensor portions 103 of the pixels 20 are connected to the common electrode lines 25, and the bias voltage is applied to the sensor portions 103 via the common electrode lines 25.

Control signals for switching the TFT switches 4 of the radiographic imaging pixels 20A flow in the first scan lines 101, and control signals for switching the TFT switches 4 of the radiation detection pixels 20B flow in the second scan lines 108. Among the pixels 20, in the radiographic imaging pixels 20A, the TFT switches 4 are switched as a result of the control signals flowing in the first scan lines 101. Further, in the radiation detection pixels 20B, the TFT switches 4 are switched as a result of the control signals flowing in the second scan lines 108.

In accordance with the switching state of the TFT switches 4 of the pixels 20, electric signals corresponding to the charges that have been accumulated in the pixels 20 flow in the signal lines 3. More specifically, electric signals corresponding to the charge quantity that have been accumulated as a result of any of the TFT switches 4 of the pixels 20 connected to those signal lines 3 being switched ON flow in the signal lines 3.

A signal detection circuit 105 that detects the electric signals flowing out in the signal lines 3, is connected to the signal lines 3. Further, a scan signal control circuit 104 that outputs the control signals for switching the TFT switches 4 ON and OFF to the first scan lines 101 is connected to the first scan lines 101. Moreover, one ends of the second scan lines 108 are connected in parallel, and the one ends are connected to a control signal output circuit 120 that outputs the control signals for switching the TFT switches 4 ON and OFF to each of the second scan lines 108.

In FIG. 1 and FIG. 5, the signal detection circuit 105 and the scan signal control circuit 104 are depicted in a simplified way so that there is one of each. However, for example, the signal detection circuit 105 and the scan signal control circuit 104 are each plurally disposed, and a predetermined number (e.g., 256) of the signal lines 3, or the first scan lines 101 are connected to each of the signal detection circuits 105 or the scan signal control circuits 104. For example, in a case where the signal lines 3 and the first scan lines 101 are disposed such that there are 1024 of each, four of the scan signal control circuits 104 are disposed, and the first scan lines 101 are connected to the scan signal control circuits 104, such that 256 each of the first scan lines 101 are connected to each of those four scan signal control circuits 104. Additionally, four of the signal detection circuits 105 are also disposed, and the signal lines 3 are connected to the signal detection circuits 105, such that 256 each of the signal lines 3 are connected to each of those four signal detection circuits 105.

The signal detection circuit 105 has, per each of the signal lines 3, built-in amplifier circuits that amplify the inputted electric signals. The signal detection circuit 105 amplifies, with the amplifier circuits, the electric signals inputted from the signal lines 3, and converts the amplified electric signals into digital data.

A control section 106 is connected to the signal detection circuit 105 and the scan signal control circuit 104. The control section 106 performs predetermined process, such as noise removal, with respect to the digital data into which the electric signals have been converted in the signal detection circuit 105, outputs control signals indicating signal detection timing with respect to the signal detection circuit 105, and outputs control signals indicating read-out timing with respect to the scan signal control circuit 104.

The control section 106 of the present exemplary embodiment is configured by a microcomputer and is equipped with a central processing unit (CPU), a ROM, a RAM, and a nonvolatile storage section such as a flash memory. The control section 106 performs, with respect to image information to which the above predetermined process has been administered, process (interpolation process) that interpolates the image information of the radiation detection pixels 20B to thereby create an image represented by the radiation with which the pixels have been irradiated. Namely, the control section 106 interpolates, on the basis of the image information to which the above predetermined processing, the image information of the radiation detection pixels 20B to thereby create an image represented by the radiation with which the pixels have been irradiated.

Moreover, the control signal output circuit 120 is connected to the control section 106, operates by control from the control section 106, and outputs the control signals for switching the TFT switches 4 ON and OFF to the second scan lines 108.

Figure 2:
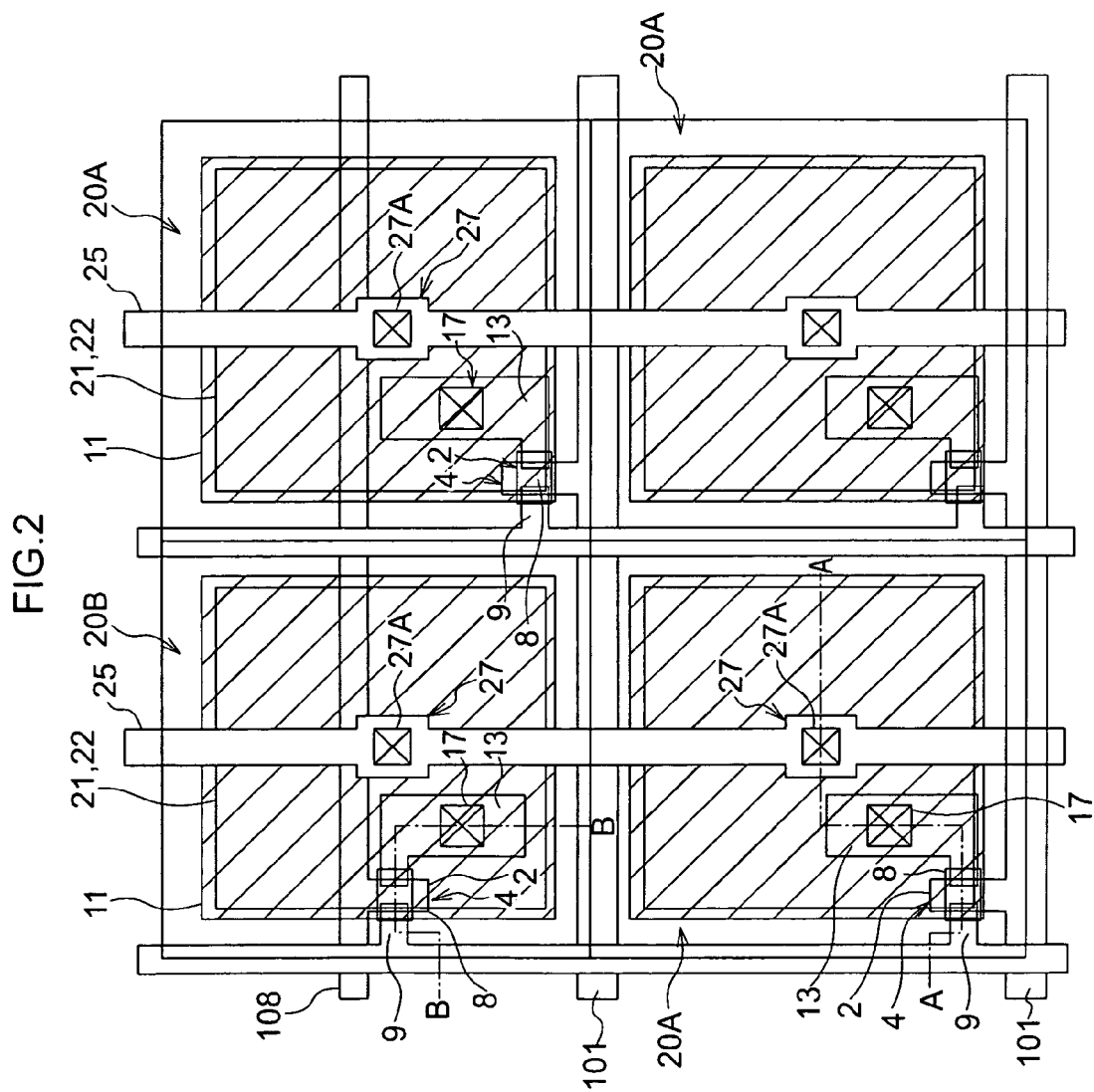
FIG. 2 is a plan view showing the configuration of a radiation detecting element, according to the exemplary embodiment.
Figure 4:
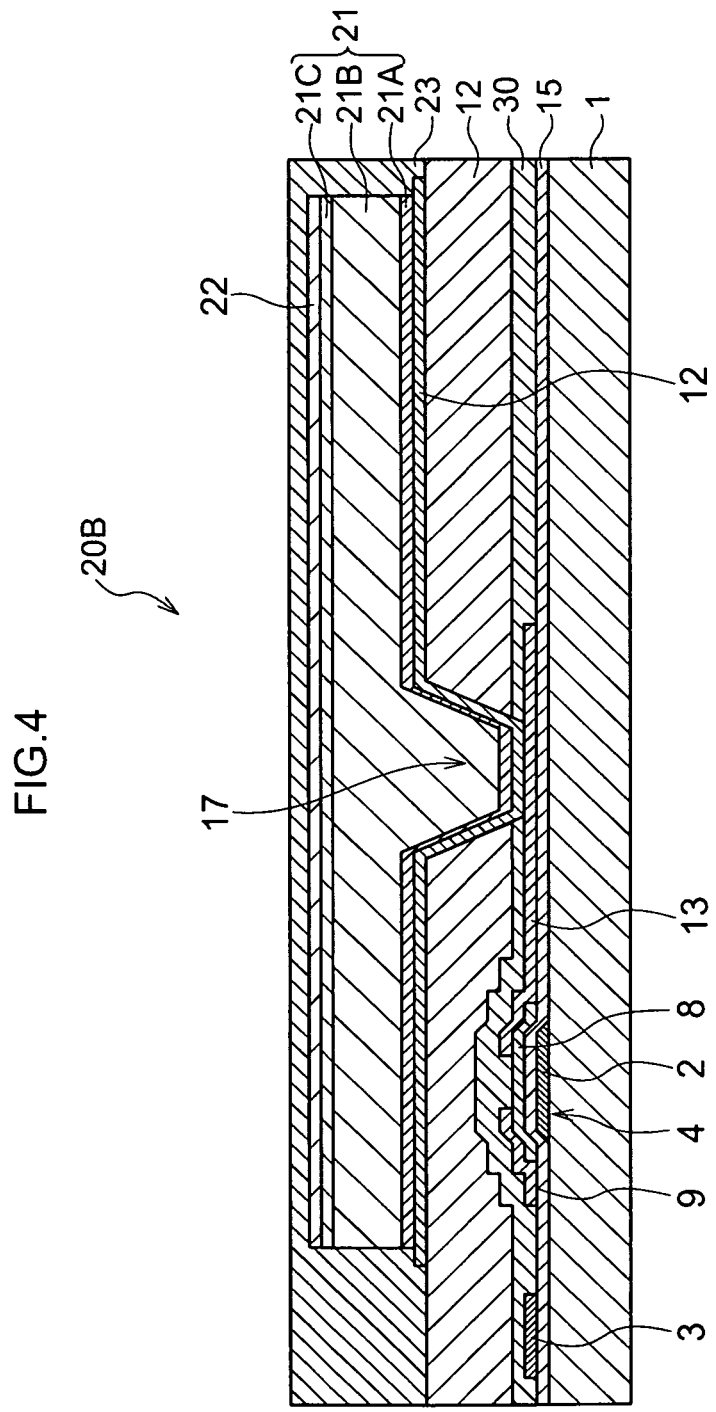
FIG. 4 is a cross-sectional view, taken along line B-B of FIG. 2, of the radiation detecting element, according to the exemplary embodiment.

FIG. 2 is a plan view showing the structure of four pixels including three radiographic imaging pixels 20A and one radiation detection pixel 20B of the indirect-conversion-type radiation detecting element 10 according to the present exemplary embodiment. FIG. 3 is a cross-sectional view, taken along line A-A of FIG. 2, of one of the radiographic imaging pixels 20A. FIG. 4 is a cross-sectional view, taken along line B-B of FIG. 2, of the radiation detection pixel 20B.

As shown in FIG. 3 and FIG. 4, in the pixels 20 of the radiation detecting element 10, the first scan lines 101 (see FIG. 2), the second scan lines 108 (see FIG. 2), and gate electrodes 2 are formed on an insulating substrate 1 comprising alkali-free glass or the like. In the pixels 20A, the gate electrodes 2 are connected to the first scan lines 101, and in the pixels 20B, the gate electrodes 2 are connected to the second scan lines 108 (see FIG. 2). The wiring layer in which the first scan lines 101, the second scan lines 108, and the gate electrodes 2 are formed (hereinafter called "first signal line layer") is formed from Al and/or Cu, or a layered film mainly composed of Al and/or Cu. However, the material of the first signal wiring layer is not limited thereto.

On the first signal line layer, an insulating film 15 is formed on one surface, and the portion on top of the gate electrodes 2 acts as a gate insulating film in the TFT switches 4. The insulation film 15 is, for example, formed from $SiN_x$ or the like by, for example, Chemical Vapor Deposition (CVD) film forming.

An island shape of a semiconductor active layer 8 is formed above the insulation film 15 on each of the gate electrodes 2. The semiconductor active layer 8 is a channel portion of the TFT switch 4 and is, for example, formed from an amorphous silicon film.

A source electrode 9 and a drain electrode 13 are formed above the aforementioned layer. In the wiring layers in which the source electrodes 9 and the drain electrodes 13 are formed, the signal lines 3 are formed. The source electrodes 9 are connected to the signal lines 3 (see FIG. 2). The wiring layer in which the source electrodes 9, the drain electrodes 13, and the signal lines 3 are formed (hereinafter called "second signal line layers") is formed from Al and/or Cu, or a layered film mainly composed of Al and/or Cu. However, the material of the second signal wiring layer is not limited thereto. A contact layer (not shown in the drawings) is formed between the semiconductor active layer 8, and both the source electrode 9 and the drain electrode 13. The contact layer is an impurity doped semiconductor layer of, for example, impurity doped amorphous silicon or the like. Each of the TFT switches 4 is configured by the gate electrode 2, the semiconductor active layer 8, the source electrode 9, and the drain electrode 13. In the TFT switches 4, the source electrodes 9 and the drain electrodes 13 may be opposite because of the polarities of the charges collected and accumulated by lower electrodes 11.

Above the second signal line layer, a TFT protective film layer 30 is formed, in order to protect the TFT switches 4 and the signal lines 3, on substantially the entire surface (substantially the entire region) of the region in which the pixels 20 are disposed on the substrate 1. The TFT protective film layer 30 is formed, for example, from $SiN_x$ or the like, by, for example, CVD film forming.

A coated interlayer insulation film 12 is formed on the TFT protective film layer 30. The interlayer insulation film 12 is formed in a film thickness of 1 to 4 μm by a photosensitive organic material (e.g., a positive photosensitive acrylic resin: a material in which a naphthoquinone diazide positive photosensitizer is mixed together with a base polymer comprising a copolymer of methacrylic acid and glycidyl methacrylate) having a low permittivity (relative permittivity $\epsilon_r$=2 to 4).

In the radiation detecting element 10 according to the present exemplary embodiment, the capacitance between metals placed on top of and under the interlayer insulation film 12 is kept low by the interlayer insulation film 12. Further, interlayer insulation film 12 also has a function as a flattening film and flattens the steps of the layers there under. In the radiation detecting element 10 according to the present exemplary embodiment, contact holes 17 are formed at positions of the interlayer insulation film 12 and the TFT protective film layer 30 opposing the drain electrodes 13.

Lower electrodes 11 of the sensor portions 103 are formed on the interlayer insulation film 12 so as to cover the pixel regions while filling in the contact holes 17. The lower electrodes 11 are connected to the drain electrodes 13 of the TFT switches 4. When a semiconductor layer 21, described later, is about 1 μm thick, there is substantially no limitation to the material of the lower electrodes 18 as long as it is a conductive material. The lower-electrodes 11 are therefore formed with a conductive metal, such as an aluminum based material, ITO or the like.

However, in cases in which the film thickness of the semiconductor layer 21 is thin (about 0.2 μm to 0.5 μm), light may not be sufficiently absorbed by the semiconductor layer 21, and measures need to be taken to prevent an increase in leak current flow due to light illumination onto the TFT switch 4. Consequently, in such cases the lower electrode 11 is preferably an alloy or layered film with a metal having light-blocking ability as a main component.

The semiconductor layer 21 is formed on the lower electrode 11 and functions as a photodiode. In the present exemplary embodiment, a photodiode of PIN structure is employed, in which an n+ layer, an i layer and a p+ layer (n+amorphous silicon, amorphous silicon, p+amorphous silicon) are layered on each other as the semiconductor layer 21. Consequently, in the semiconductor layer 21 of the present exemplary embodiment, an n+ layer 21A, an i layer 21B and a p+ layer 21C are formed, layered in this sequence from the bottom layer. The i layer 21B generates charge (pairs of free electrons and free holes) due to illumination of light. The n+ layer 21A and the p+ layer 21C function as contact layers, and respectively electrically connect the lower electrode 11 and the upper electrode 22 with the i layer 21B. The i layer 21B corresponds to a photoelectric conversion layer of the present invention.

In the present exemplary embodiment, the lower electrodes 11 are formed with larger surface area than the semiconductor layer 21. Further, the light illumination side of the TFT switch 4 is covered by the semiconductor layer 21. Accordingly, in the present exemplary embodiment, the proportion of surface area within the pixel regions that can receive light (called the fill factor) is made larger, and light can be suppressed from being incident on the TFT switches 4.

Individual upper electrodes 22 are formed on each of the semiconductor layers 21. The upper electrodes 22 are, for example, formed using a material having high light transmissive, such as ITO, Indium Zinc Oxide (IZO) or the like. In the radiation detection element 10 according to the present exemplary embodiment, each of the sensor section 103 is configured including the upper electrode 22, the semiconductor layer 21, and the lower electrode 11.

To cover each of the semiconductor layers 21A, a coated interlayer insulation film 23 is formed on the interlayer insulation film 12, the semiconductor layers 21, and the upper electrodes 22 so as to have openings 27A at a portion corresponding to the upper electrodes 22.

On the interlayer insulation film 23, the common electrode lines 25 are formed by Al and/or Cu, or a layered film mainly composed of Al and/or Cu. Contact pads 27 are formed neighboring the openings 27A, and the common electrode lines 25 are electrically connected to the upper electrodes 22 via the openings 27A in the interlayer insulation film 23.

In the radiation detection element 10 configured as described above, as required, a protection layer may be formed from an insulating material with low light absorption characteristics, and a scintillator, configured, for example, from GOS or the like, is attached using an adhesive resin with low light absorption characteristics formed on the surface of the protection layer.

Here, as shown in FIG. 5, it is preferable for the radiation detection pixels 20B to be formed in the radiation detecting element 10 such that they are plurally placed with respect to specific signal lines 3 (here, D2 and D5 signal lines 3). Further, it is preferable for the pixels 20B to be formed at intervals equal to or greater than one pixel apart from each other such that the pixels 20B are not placed continuously. Because of this, the image quality of the image created by the interpolation process in the control section 106 becomes high compared to a case where the radiation detection pixels 20B are placed continuously.

In FIG. 5, the radiation detecting element 10 is depicted in a simplified manner, but in a case where there are 1024 of the signal lines 3 disposed, for example, eight of the signal lines 3 are selected every 128 lines, and sixteen of the pixels 20B are formed every other 64 pixels in the selected eight signal lines 3. Due thereto, the placement positions of the pixels 20B become uniform. In this case, the number of the pixels 20B becomes 128, and in a case where there are 1024×1024 of the pixels 20, the pixels 20B occupy 0.01% of all of the pixels 20. The ratio of the radiation detection pixels 20B with respect to all of the pixels 20 is not limited thereto. Various ratios are conceivable, and this ratio can also be determined on the basis of the precision of the interpolation processing in the control section 106, and so forth. For example, in a case where the image quality of the image created by the interpolation process is high, the ratio of the radiation detection pixels 20B with respect to all of the pixels 20 may be about 1%, for example, or the percentage may be raised even more.

Figure 6:
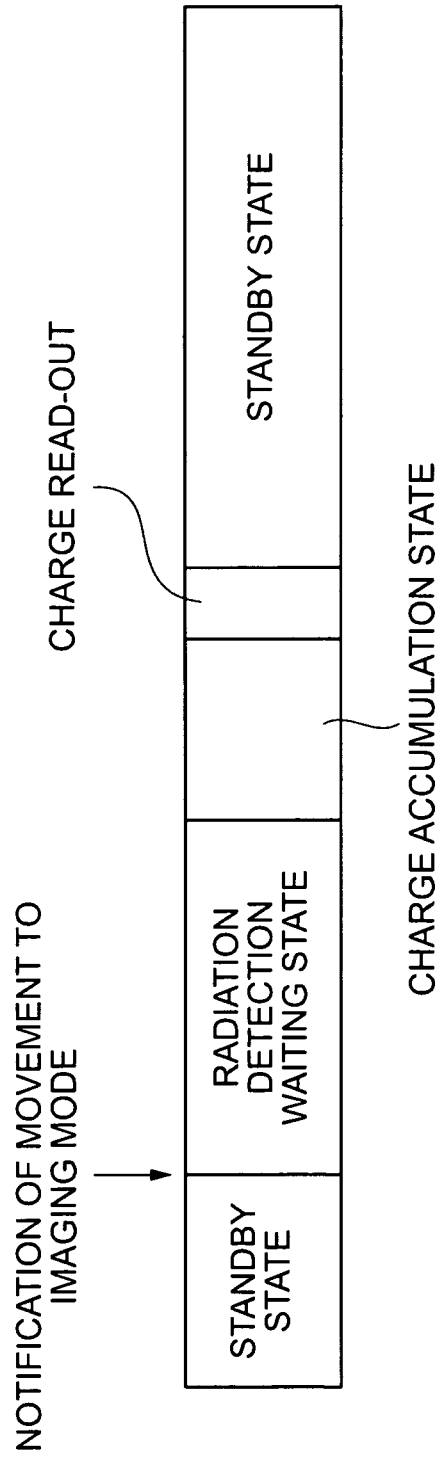
FIG. 6 is a schematic diagram schematically showing a flow of an operation by the radiographic imaging device, according to the exemplary embodiment, when imaging a radiographic image.

Next, operations of the radiographic imaging device 100 with the above configuration when imaging a radiographic image will be described using FIG. 6.

In the radiation detecting element 10, charges are generated by dark current or the like even when the radiation detecting element 10 is not being irradiated by radiation, and the charges are accumulated in the pixels 20. Accordingly, during the standby state, the radiographic imaging device 100 repeatedly performs a reset operation in which it extracts and removes the charges that have been accumulated in the pixels 20 of the radiation detecting element 10. The information resulting from the charges that have been read out by the reset operation is utilized in the correction of noise (offset) generated in radiographic images by dark current or the like.

The radiographic imaging device 100 is configured for imaging a radiographic image by detecting the start of irradiation of radiation, and starting the accumulation of charges in the pixels 20 of the radiation detecting element 10. When radiographic imaging is to be performed, the radiographic imaging device 100 is notified of movement to an imaging mode.

When the radiographic imaging device 100 is notified of the movement to the imaging mode, it moves to a radiation detection waiting state in which it performs detection of radiation. When the radiographic imaging device 100 detects radiation, it moves to a charge accumulation state in which it accumulates charges in the radiation detecting element 10. After a predetermined period after detecting radiation, the radiographic imaging device 100 moves to a charges read-out state in which it reads out the charges that have been accumulated. After the end of the read-out of the charges, the radiographic imaging device 100 moves to the standby state.

Figure 7:
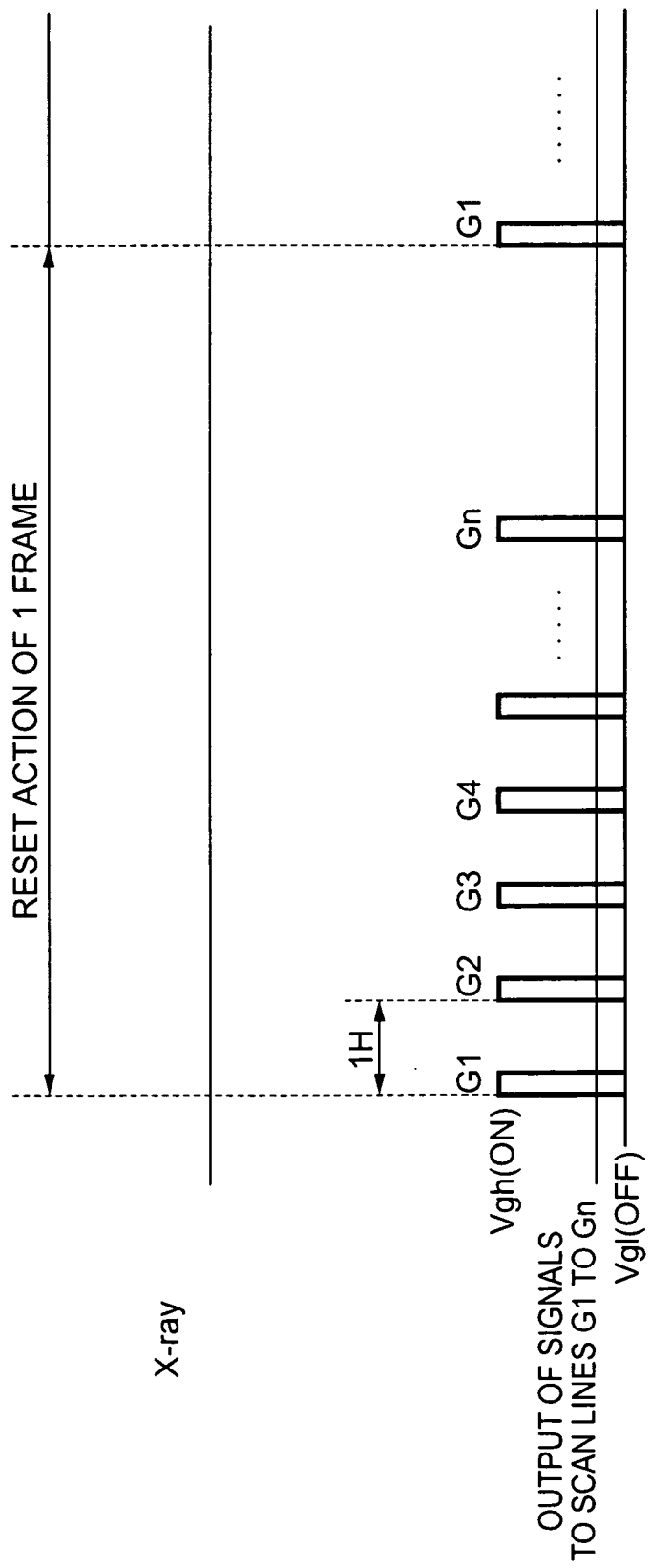
FIG. 7 is a time chart showing in detail a flow of an operation in a standby state of the radiographic imaging device, according to the exemplary embodiment.
Figure 8:
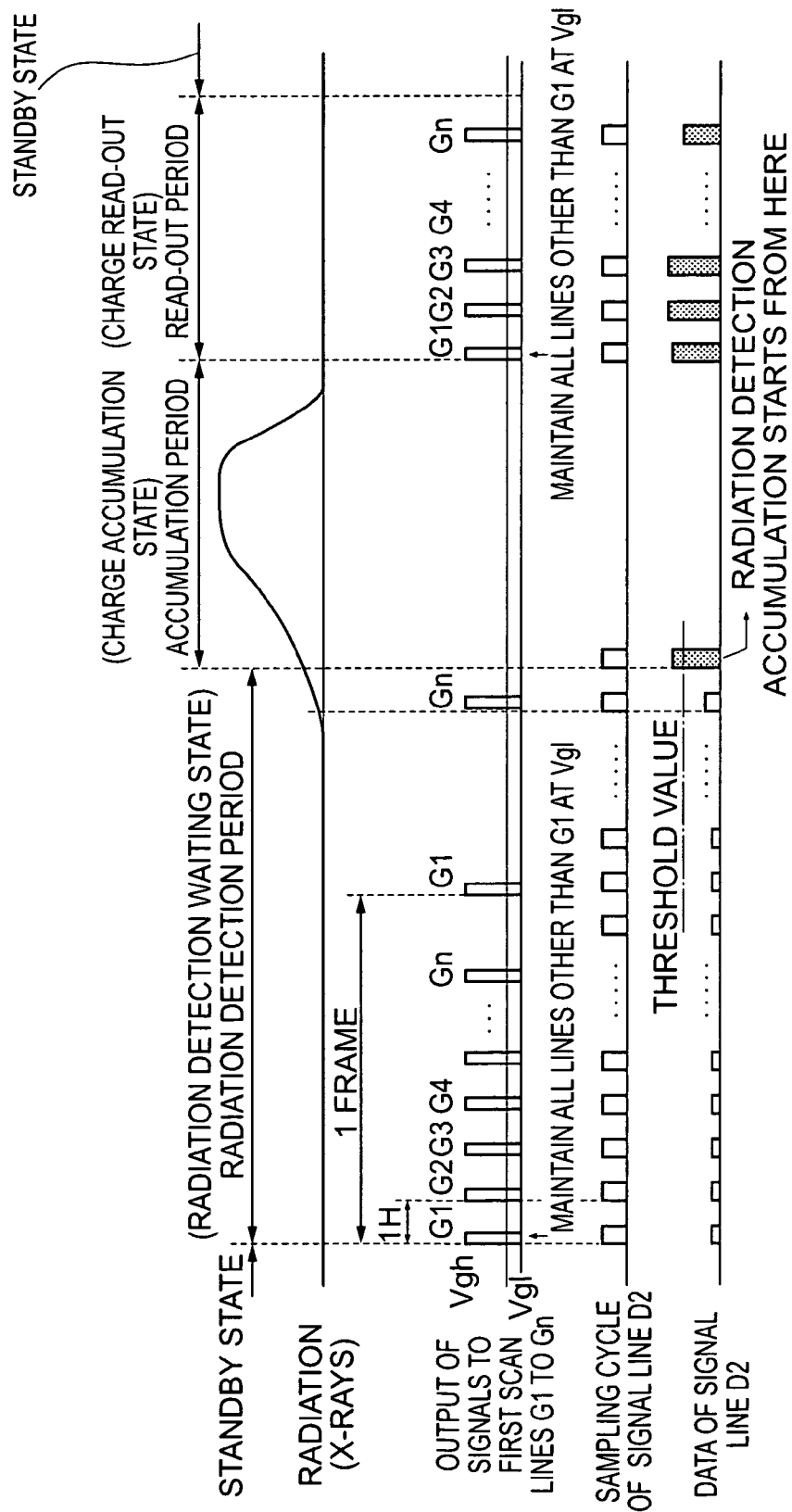
FIG. 8 is a time chart showing in detail a flow of operations by the radiographic imaging device, according to the exemplary embodiment, when capturing a radiographic image.

FIG. 7 and FIG. 8 are timing charts showing flows of operations when the radiographic imaging device 100 according to the present exemplary embodiment captures a radiographic image.

In the case of the standby state, the control section 106 controls the scan signal control circuit 104 so that, as shown in FIG. 7, the control section 106 causes ON signals (signals of electric potential VgH) to be outputted to the first scan lines 101 sequentially one line at a time from the scan signal control circuit 104, switches on sequentially one line at a line the TFT switches 4 connected to the first scan lines 101, and performs read-out of the charges. Due thereto, the charges that have been accumulated in the pixels 20 sequentially one line at a time flow out to the signal lines 3 as electric signals. After the elapse of a predetermined period while the action state is the standby state, the control section 106 repeats the reset operation in which it causes ON signals to be outputted to the first scan lines 101 sequentially one line at a time, extracts the charges that have been accumulated in each of the pixels 20 of the radiation detecting element 10, and resets one frame's worth.

The control section 106 moves to the radiation detection waiting state when it is notified of the movement to the imaging mode.

When the radiation detection waiting period becomes long, charges are accumulated in the pixels 20 because of dark current or the like.

Therefore, as shown in FIG. 8, in the case of the radiation detection waiting state, the control section 106 performs a reset operation in which it controls the scan signal control circuit 104 to cause ON signals to be outputted to the first scan lines 101 sequentially one line at a time from the scan signal control circuit 104. Then, the control section 106 switches ON sequentially one line at a time the TFT switches 4 connected to the first scan lines 101, and extracts the charges that have been accumulated in each of the pixels 20 of the radiation detecting element 10.

Further, the control section 106 controls the control signal output circuit 120 to cause ON signals to be outputted to the second scan lines 108 from the control signal output circuit 120 in a predetermined cycle 1H. Then, the control section 106 controls the signal detection circuit 105, in the predetermined cycle 1H, to repeat sampling, and to convert the electric signals flowing in the signal lines 3 to which the pixels 20B are connected (in the case of FIG. 5, at least one of D2 and D5; for example, D2) into digital data to perform radiation detection. Note that the predetermined cycle 1H is made the same as the cycle with respect to one line when performing image read-out, or the reset operation by outputting the ON signals to the first scan lines 101 sequentially one line at a time from the scan signal control circuit 104.

Further, the control section 106 compares the value of the digital data (into which the electric signals have been converted by the signal detection circuit 105) of the signal lines 3 to which the pixels 20B are connected with a predetermined threshold value for radiation detection, and performs detection of whether the pixels have been irradiated by radiation, by determining whether the value of the digital data is equal to or greater than a threshold value.

The radiographic imaging device 100 is placed with an interval from a radiation generating device that generates radiation, and the radiographic imaging device 100 is irradiated by radiation that has been transmitted through an examinee.

When the radiographic imaging device 100 is irradiated with radiation, the radiation is absorbed by the scintillator, and is converted to visible light. The radiographic imaging device 100 may be irradiated with the radiation from either the front side or the back side of the radiation detecting element 10. The sensor portions 103 of the pixels 20 are illuminated with the visible light into which the radiation has been converted by the scintillator.

In the sensor portions 103, charges are generated inside when the sensor portions 103 are illuminated by light. The generated charges are collected by the lower electrodes 11. Due thereto, the charges that have been collected in the lower electrodes 11 are accumulated in the pixels 20.

In the radiation detection pixels 20B, the TFT switches 4 are switched as a result of ON signals flowing in the second scan lines 108 in the predetermined cycle 1H, and the accumulated charges flow out to the signal lines 3.

In the present exemplary embodiment, as shown in FIG. 5, the radiation detection pixels 20B are selectively placed with respect to specific signal lines 3 (here, D2 and D5 signal lines 3). The electric signals flowing out from the pixels 20B are integrated per specific signal line 3. Namely, by plurally placing the pixels 20B on the specific signal lines 3, the change in the level of the electric signals resulting from radiation becomes larger, and therefore the precision of radiation is detection can be raised.

The control section 106 compares the value of the digital data (into which the electric signals have been converted by the signal detection circuit 105) of the signal lines 3 (in the case of FIG. 5, at least one of D2 and D5; for example, D2) to which the pixels 20B are connected, with the predetermined threshold value for radiation detection. Then, the control section 106 performs detection of whether the pixels have been irradiated with radiation by whether the value of the digital data is equal to or greater than the threshold value.

When the control section 106 detects irradiation of radiation, it stops the reset operation and allows the charges to be accumulated in the pixels 20A of the radiation detecting element 10. After the elapse of a predetermined accumulation period, the control section 106 controls the scan signal control circuit 104 to cause ON signals to be outputted to the first scan lines 101 sequentially one line at a time from the scan signal control circuit 104. Then, the scan signal control circuit 104 applies the ON signals sequentially via the first scan lines 101 to the gate electrodes 2 of the TFT switches 4. Due thereto, the TFT switches 4 of the pixels 20A of the radiation detecting element 10 are sequentially switched ON, and electric signals corresponding to the charges that have been accumulated in the pixels 20A flow out to the signal lines 3. The signal detection circuit 105 converts the electric signals flowing in the signal lines 3 into digital data. The control section 106 performs predetermined processing with respect to the digital data into which the electric signals have been converted, performs processing that interpolates the image information of the radiation detection pixels 20B with respect to the image information to which the predetermined processing has been administered, and creates an image represented by the radiation with which the pixels have been irradiated.

In this way, according to the present exemplary embodiment, by disposing the radiographic imaging pixels 20A and the radiation detection pixels 20B in the imaging region of the radiation detecting element 10 in which a radiographic image is capable of being captured, radiation may be reliably detected even when the region irradiated by radiation has been narrowly set.

Further, according to the present exemplary embodiment, detection of irradiation of radiation may also be performed by the signal detection circuit 105 for radiographic imaging, so it is not necessary to separately dispose a detection circuit.

Further, according to the present exemplary embodiment, by giving the radiation detection pixels 20B the same shape as the radiographic imaging pixels 20A and dispersing and placing the pixels 20B, artifact generation and a deterioration in the image quality of the radiographic images that are imaged may be prevented.

Further, the radiographic imaging device 100 according to the present exemplary embodiment detects the start of irradiation of radiation, and starts the accumulation of charges in the pixels 20. Accordingly, the radiation with which the pixels have been irradiated in the period until irradiation with the radiation is detected, no longer contributes to the radiographic image. However, because the period of irradiation of radiation in normal imaging is equal to or greater than 100 ms, and the cycle 1H is around 10 µs, the radiation with which the pixels have been irradiated may be utilized with virtually no loss.

Further, according to the present exemplary embodiment, by intensively disposing the plural (in the present exemplary embodiment, 16 pixels) radiation detection pixels 20B on the specific signal lines 3, charges corresponding to a several-fold (in the present exemplary embodiment, a 16-fold) increase over that of a case where only one of the pixels 20B is disposed can be obtained. Due thereto, irradiation of radiation can be detected at a stage where there is little radiation energy, and the radiographic imaging device 100 can move to the accumulation action. Namely, the present exemplary embodiment may reduce radiation loss. In particular, with X-rays, the response characteristic is slow and there are many cases where high energy does not appear in the initial stage of irradiation. For this reason, by intensively disposing the plural radiation detection pixels 20B on the specific signal lines 3, the precision of detecting the start of irradiation with X-rays may improve.

Further, according to the present exemplary embodiment, during the radiation detection waiting period, the electric signals resulting from the reset operation also flow in the signal lines 3. However, because the radiation detection pixels 20B are plurally placed on the specific signal lines 3, the present exemplary embodiment may distinguish between irradiation of radiation and the reset operation from the level of the electric signals easily.

Further, according to the present exemplary embodiment, during the radiation detection waiting period, the same reset operation as in the standby state is performed. Accordingly, in the present exemplary embodiment, the most recent data for offset correction may be acquired. Since the offset generated in the pixels 20 of the radiation detecting element 10 may change over time in accordance with the state of the radiation detecting element 10, noise in radiographic images may be reduced by performing correction on the basis of the most recent data for offset correction.

Further, according to the present exemplary embodiment, the reset operation is stopped when irradiation of radiation has been detected. Accordingly, the present exemplary embodiment may keep the radiation loss resulting from the reset operation to only one line's worth. In a case where the radiation at the point in time when irradiation with the radiation starts is small, the present exemplary embodiment may use that image as is, because the ratio of radiation loss is small. As a result of stopping the reset operation, a step occurs in the image at the line where the reset operation was stopped in the radiographic image. However, the step may be corrected by performing interpolation process from the image information of the line adjacent to the step.

Further, in the radiographic imaging device 100 according to the present exemplary embodiment, by disposing the second scan lines 108 in parallel to the first scan lines 101, and connecting the gates of the TFT switches 4 of the radiation detection pixels 20B to the second scan lines 108, in the pixels 20B, the accumulated charges flow out to the signal lines 3 as electric signals due to the control signals from the second scan lines 108. Accordingly, the present exemplary embodiment may detect the radiation by the sampling of the signal detection circuit 105, even in the off period in which OFF signals (signals of electric potential Vgl) are being outputted to the first scan lines 101 by the scan signal control circuit 104. Further, the present exemplary embodiment may detect the radiation by the sampling of the signal detection circuit 105, even in the period of the reset operation in which the ON signals are being sequentially outputted to the first scan lines 101.

Figure 9:
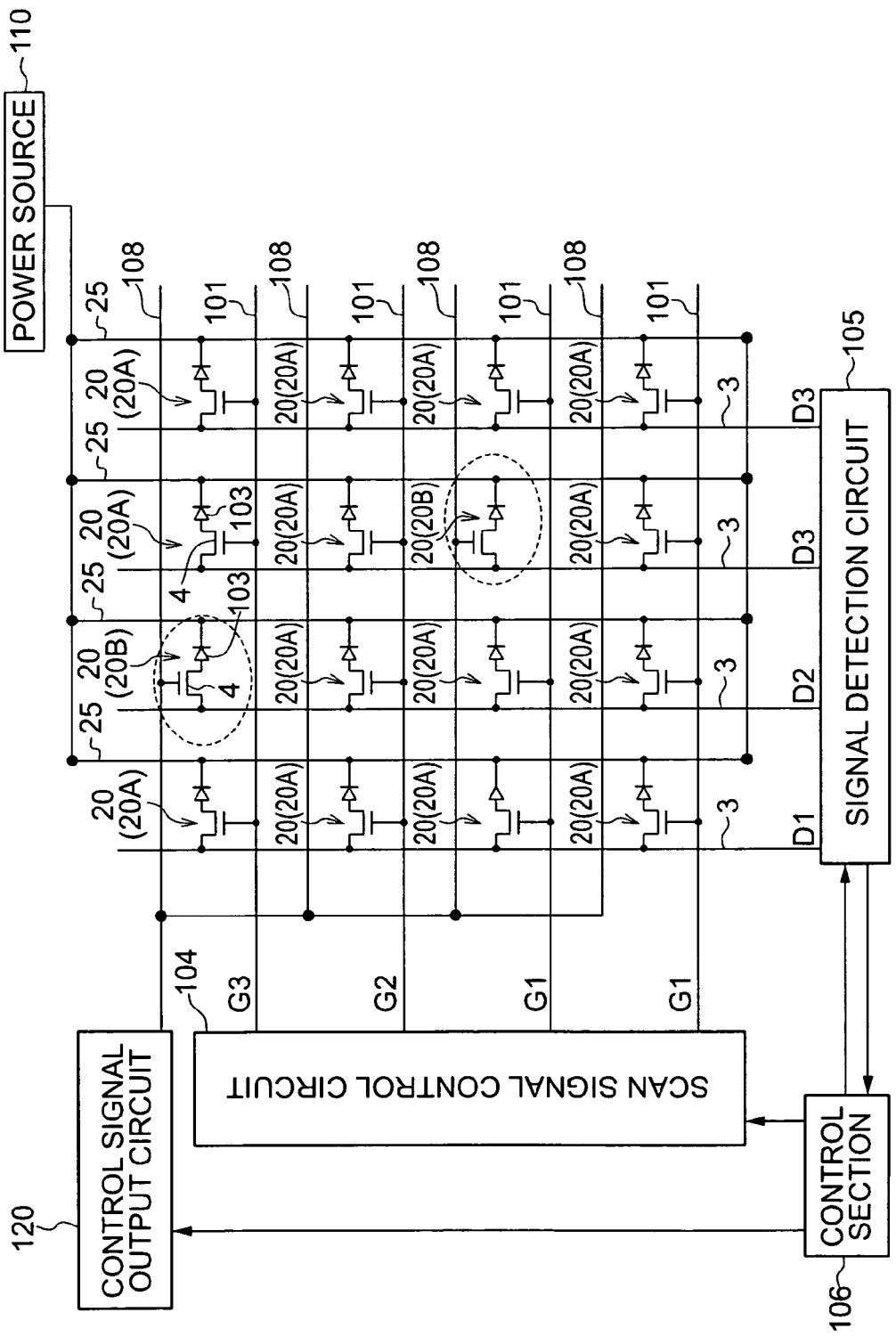
FIG. 9 is a configuration diagram showing the configuration of a radiation detecting element, according to an alternative exemplary embodiment.

In the above exemplary embodiment, a case where, as shown in FIG. 1, the second scan lines 108 are disposed in parallel to the first scan lines 101 on the pixel rows in the intersecting direction in which the radiation detection pixels 20B are disposed, has been described. However the present invention is not limited thereto. For example, as shown in FIG. 9, the present invention may also be configured such that the second scan lines 108 are disposed in parallel to the first scan lines 101 on all of the pixel rows in the intersecting direction, and such that the TFT switches 4 of the radiation detection pixels 20B are connected to the second scan lines 108. The wiring pattern of the signal lines 3 may be made the same as the first scan lines 101 and the second scan lines 108.

Figure 10:
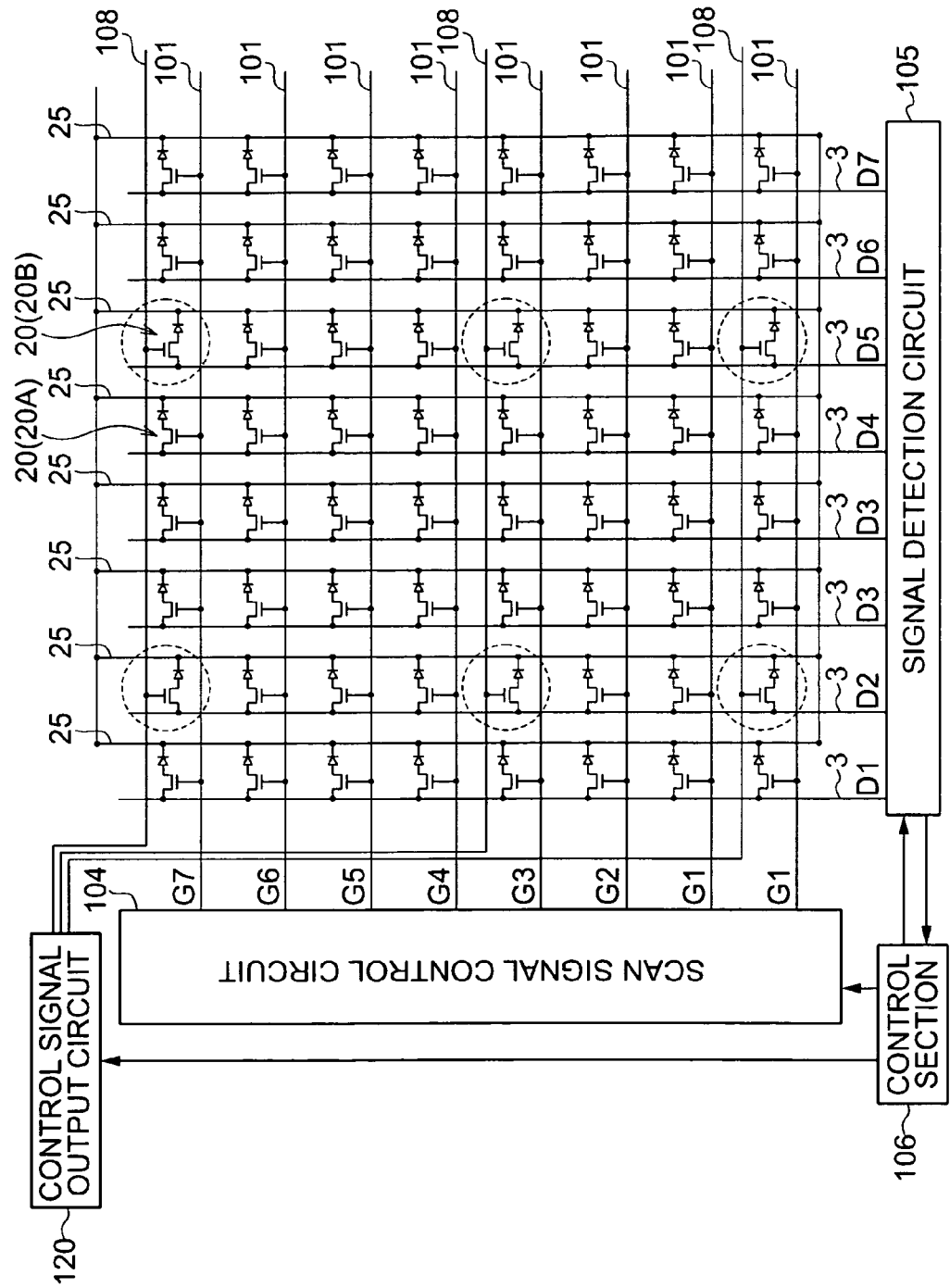
FIG. 10 is a configuration diagram showing an arrangement of radiographic imaging pixels and radiation detection pixels of a radiation detecting element, according to the alternative exemplary embodiment.

Further, in the above exemplary embodiment, a case where, as shown in FIG. 5 (FIG. 1), the one ends of the second scan lines 108 are connected in parallel and the control signals that switch on the TFT switches 4 are outputted at once to all of the second scan lines 108 from the control signal output circuit 120, has been described. However the present invention is not limited thereto. For example, as shown in FIG. 10, the present invention may also be configured such that the second scan lines 108 are individually connected to the control signal output circuit 120, and such that the control signals that switch on the TFT switches 4 are individually outputted to the second scan lines 108 from the control signal output circuit 120. Accordingly, in the above configuration, a region may be selected and radiation detection may be performed.

Further, in the above exemplary embodiment, a case where the radiographic imaging pixels 20A and the radiation detection pixels 20B are disposed as the pixels 20 in the radiation detecting element 10 has been described. However, pixels for other purposes, for example, may also be disposed.

Further, in the above exemplary embodiment, a case where, during the radiation detection waiting state, in the predetermined cycle 1H the signal detection circuit 105 repeats sampling, in which it converts the electric signals flowing in the signal lines 3 to which the pixels 20B are connected into digital data to perform radiation detection, and performs detection of the start of irradiation of radiation, has been described. However the present invention is not limited thereto. For example, the present invention may also be configured such that, even after detection of irradiation of irradiation, in the predetermined cycle 1H the signal detection circuit 105 repeats sampling, in which it converts the electric signals flowing in the signal lines 3 to which the pixels 20B are connected into digital data to perform radiation detection, compares the value of the digital data of the signal lines 3 to which the pixels 20B are connected with the predetermined threshold value for radiation detection, and performs detection of the end of irradiation of radiation by whether the value of the digital data is less than the threshold value. Further, the present invention may also be configured to accumulate the digital data detected in each sampling to detect the cumulative total of the quantity of radiation with which the pixels are irradiated. By making it possible to detect the cumulative total of the quantity of radiation with which the pixels are irradiated, the pixels 20B may be used as sensors for detecting the quantity of radiation with which the pixels are irradiated (AEC).

Figure 11:
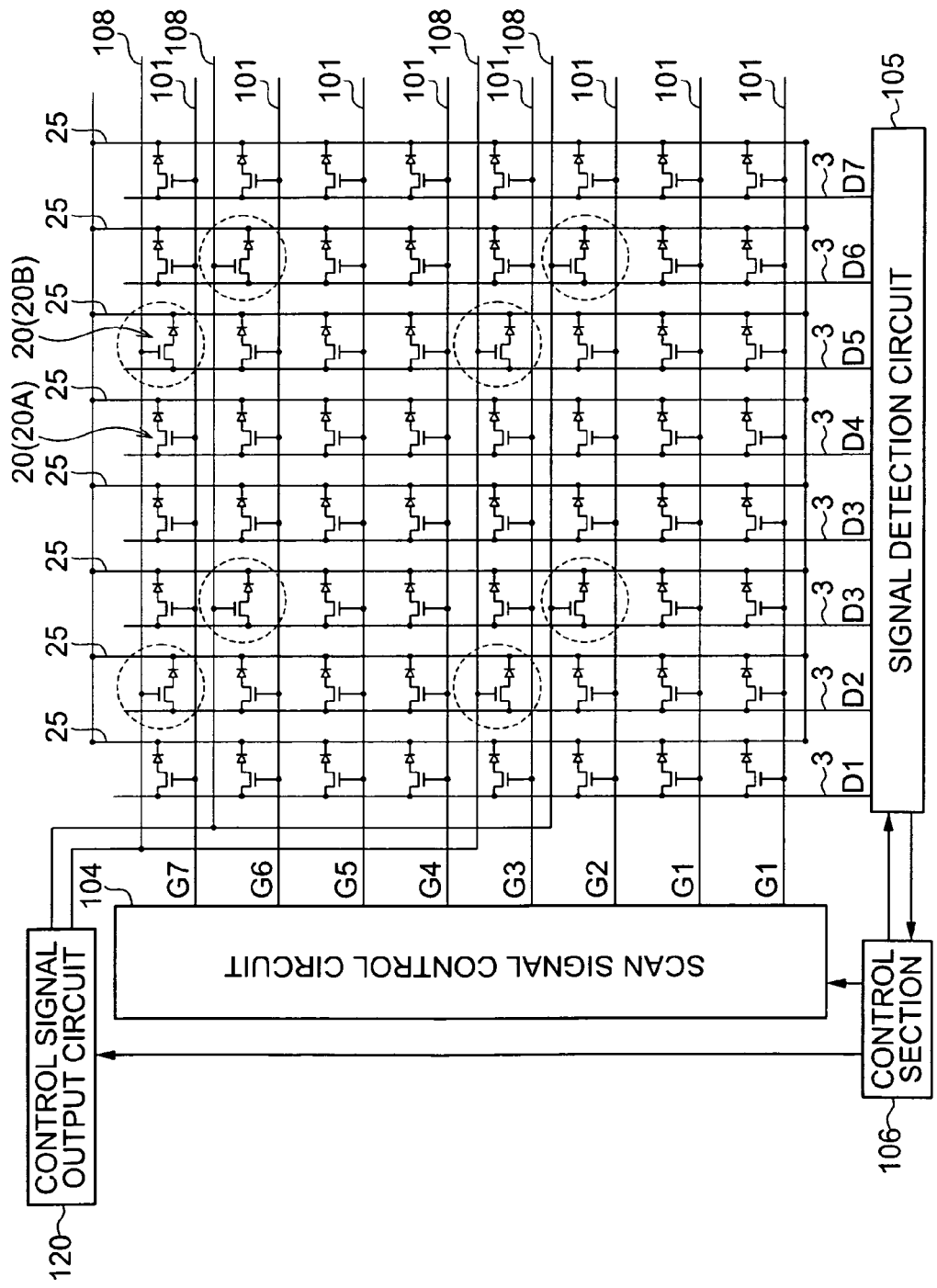
FIG. 11 is a configuration diagram showing an arrangement of radiographic imaging pixels and radiation detection pixels of a radiation detecting element, according to the alternative exemplary embodiment.

Further, in the above exemplary embodiment, a case where, as shown in FIG. 5, the radiation detection pixels 20B are dispersed and placed has been described. However the present invention is not limited thereto. For example, as shown in FIG. 11, the plural pixels 20B may also be intensively placed in specific region. As for the specific region, in a case where detection of the start of irradiation or the end of irradiation of radiation is performed by the pixels 20B, the specific region is preferably the area around the region where the subject is mainly placed. On the other hand, in a case where detection of the quantity of radiation with which the pixels are irradiated is performed by the pixels 20B, the specific region is preferably the region where the subject is mainly placed. In usual imaging, the central portion of the detection region becomes the region where the subject is mainly placed, and in breast imaging, one end portion of the detection region on the patient side becomes the region where the subject is mainly placed. Because the control section 106 performs the interpolation processing that interpolates the image information of the pixels 20B, it is preferable for the pixels 20B to not lie next to each other; for example, the pixels 20B may be placed so that they become diagonal to each other. In this case, the pixels 20B placed in the specific ranges may be divided into plural groups, and the one ends of the second scan lines 108 connected to the pixels 20B per group may be connected in parallel and connected to the control signal output circuit 120. Accordingly, redundancy may be imparted even in a case where wire breakage has occurred in any of the second scan lines 108, or has occurred in the pixels 20B, and an improvement in manufacturing yield and reliability may be realized.

Further, in the above exemplary embodiment, a case where, as shown in FIG. 8, the output of the ON signals (signals of electric potential VgH) from the scan signal control circuit 104 to the first scan lines 101 and the sampling that performs radiation detection by the signal detection circuit 105 together with causing the ON signals to be outputted from the control signal output circuit 120 to the second scan lines 108 are synchronized as been described. However the present invention is not limited thereto. For example, the present invention may also be configured as something that performs the sampling that performs radiation detection by the signal detection circuit 105 together with causing the ON signals to be outputted from the control signal output circuit 120 to the second scan lines 108 in the period in which the OFF signals (signals of electric potential Vgl) are being outputted to all of the first scan lines 101 during the predetermined cycle 1H. Further, the control section 106 may also be configured to control the scan signal control circuit 104 so as to output control signals that prohibit extraction of the charges with respect to the first scan lines 101 while the control signal output circuit 120 is outputting the control signals that perform extraction of the charges to the second scan lines 108. Accordingly, the read-out of the radiographic imaging pixels 20A and the radiation detection pixels 20B is divided and executed, and the data of the radiographic imaging pixels 20A is no longer mixed with the digital data of the radiation detection pixels 20B, so the precision of radiation detection improves.

Further, in the above exemplary embodiment, a case where, as shown in FIG. 7 and FIG. 8, the control signals that perform extraction of the charges are sequentially outputted from the scan signal control circuit 104 to the first scan lines 101 at the time of the reset operation has been described. However the present invention is not limited thereto. For example, the control signals that perform extraction of the charges may also be outputted at once from the scan signal control circuit 104 to all of the first scan lines 101.

Further, in the above exemplary embodiment, a case where the present invention is applied to the radiation detecting element 10 of the indirect conversion system has been described. However, the present invention may also be applied to a radiation detecting element of the direct conversion system that directly converts radiation into charges and accumulates the charges in a semiconductor layer.

Further, in the above exemplary embodiment, a case where the present invention is applied to the radiographic imaging device 100 that detects an image by detecting X-rays has been described. However the present invention is not limited thereto. For example, the radiation serving as the detection target may be any of X-rays, visible light, ultraviolet rays, infrared rays, gamma rays, particle rays, etc.

In addition, the configuration of the radiographic imaging device 100 and the configuration of the radiation detecting element 10 that have been described in the above exemplary embodiment are examples and, it goes without saying, are appropriately alterable in a scope that does not depart from the gist of the present invention.

What is claimed is:

1. A radiation detecting element comprising:
a plurality of pixels disposed in a matrix in a common detection region that detects radiation, each pixel including a sensor portion that generates charges based on irradiation of radiation or on illumination of light that has been converted from radiation, and a switch element configured to read out the generated charges;
a plurality of first scan lines, connected to the switch elements included in pixels that are employed as radiographic imaging pixels out of the plurality of pixels, through which control signals for switching the switch elements flow;
a plurality of second scan lines, connected to the switch elements included in pixels that are employed as radiation detection pixels among the plurality of pixels, through which control signals for switching the switch elements flow; and
a plurality of signal lines, connected to the switch elements, through which electric signals flow corresponding to the charges that are generated in the pixels, in accordance with the switching state of the switch elements,
wherein the radiographic imaging pixels and the radiation detection pixels are located within the common detection region.

2. The radiation detecting element according to claim 1, wherein the radiation detection pixels are plurally disposed with intervals equal to or greater than one pixel apart from each other, on some signal lines among the plurality of signal lines.

3. The radiation detecting element according to claim 1, wherein the radiation detection pixels are intensively placed in a specific region in the common detection region.

4. The radiation detecting element according to claim 1, wherein the plurality of second scan lines are disposed only at pixel rows in which the radiation detection pixels are disposed in the matrix.

5. The radiation detecting element according to claim 1, wherein one ends of the second scan lines are connected in parallel.

6. A radiographic imaging device comprising:
a radiation detecting element comprising:
a plurality of pixels disposed in a matrix in a common detection region that detects radiation, each pixel including a sensor portion that generates charges based on irradiation of radiation or on illumination of light that has been converted from radiation, and a switch element configured to read out the generated charges;
a plurality of first scan lines, connected to the switch elements included in pixels that are employed as radiographic imaging pixels out of the plurality of pixels, through which control signals for switching the switch elements flow;
a plurality of second scan lines, connected to the switch elements included in pixels that are employed as radiation detection pixels among the plurality of pixels, through which control signals for switching the switch elements flow; and
a plurality of signal lines, connected to the switch elements, through which electric signals flow corresponding to the charges that are generated in the pixels, in accordance with the switching state of the switch elements,
wherein the radiographic imaging pixels and the radiation detection pixels are located within the common detection region;
a first control signal output section that, when imaging a radiographic image, repeatedly outputs control signals for performing read out of the charges to the plurality of second scan lines; and
a detection section that detects, on the basis of the electric signals flowing in the plurality of signal lines, at least one of the start of irradiation of radiation, the end of irradiation of radiation, and an amount of irradiated radiation.

7. The radiographic imaging device according to claim 6, wherein
the detection section detects the start of irradiation of radiation, and
the radiographic imaging device further comprises,
a second control signal output section that outputs control signals for performing read out of the charges to the plurality of first scan lines, a creation section that creates image information representing a radiographic image on the basis of the electric signals flowing in the plurality of signal lines, and a control section which, during standby, controls the second control signal output section so as to repeatedly perform a reset operation, which outputs control signals for reading out the charges with respect to the plurality of first scan lines to extract the charges from the radiographic imaging pixels of the radiation detecting element, and, when imaging a radiographic image, when the start of irradiation of radiation has been detected by the detection section, controls the second control signal output section to output control signals that prohibit extraction of the charges with respect to the plurality of first scan lines and, after the end of irradiation of radiation, output control signals that perform extraction of the charges to the plurality of first scan lines.

8. The radiographic imaging device according to claim 7, wherein the control section controls the second control signal output section to repeatedly perform the reset operation until the start of irradiation of radiation is detected by the detection section when imaging a radiographic image.

9. The radiographic imaging device according to claim 7, wherein the control section controls the second control signal output section to output control signals that prohibit extraction of the charges with respect to the plurality of first scan lines, while the first control signal output section is outputting control signals that perform extraction of the charges with respect to the plurality of second scan lines.

10. The radiographic imaging device according to claim 7, wherein the second control signal output section outputs control signals for reading out the charges sequentially to the plurality of first scan lines, or at once to all of the plurality of first scan lines, during the reset operation.

11. The radiographic imaging device according to claim 7, wherein the creation section interpolates image information of the radiation detection pixels to create image information representing a radiographic image.

* * * * *